United States Patent
Allen et al.

(10) Patent No.: US 9,365,146 B1
(45) Date of Patent: Jun. 14, 2016

(54) HOT OR COLD CUP HOLDER FOR VEHICLES

(71) Applicants: Charlette A. Allen, Norfolk, VA (US); Shaunice Wallace, Norfolk, VA (US)

(72) Inventors: Charlette A. Allen, Norfolk, VA (US); Shaunice Wallace, Norfolk, VA (US)

( * ) Notice: Subject to any disclaimer, the term of this patent is extended or adjusted under 35 U.S.C. 154(b) by 135 days.

(21) Appl. No.: 14/217,928

(22) Filed: Mar. 18, 2014

(51) Int. Cl.
*B60N 3/10* (2006.01)
*F25B 1/00* (2006.01)
*F25B 21/02* (2006.01)

(52) U.S. Cl.
CPC . *B60N 3/104* (2013.01); *F25B 1/00* (2013.01); *F25B 21/02* (2013.01)

(58) Field of Classification Search
CPC ... F25D 31/002; F25D 31/007; F25D 31/005; A47J 31/50; A47J 41/003; A47J 41/0038; A47J 42/54; B60N 3/104
See application file for complete search history.

(56) References Cited

U.S. PATENT DOCUMENTS

| | | | |
|---|---|---|---|
| 6,072,161 A | 6/2000 | Stein | |
| 6,075,229 A | 6/2000 | Vanselow | |
| 6,082,114 A | 7/2000 | Leonoff | |
| 6,121,585 A | 9/2000 | Dam | |
| 6,530,232 B1 | 3/2003 | Kitchens | |
| 6,809,302 B1 * | 10/2004 | Jones | A47J 36/2438 219/521 |
| D498,119 S | 11/2004 | Martin et al. | |
| 7,089,749 B1 | 8/2006 | Schafer | |
| 2003/0074903 A1 * | 4/2003 | Upadhye | A47J 36/2438 62/3.3 |
| 2010/0018223 A1 * | 1/2010 | Sundhar | F25D 31/007 62/3.63 |
| 2010/0126695 A1 | 5/2010 | Gara | |

* cited by examiner

Primary Examiner — Cassey D Bauer

(57) ABSTRACT

The Hot or Cold Cup Holder for Vehicles is a beverage holder that is capable of warming or cooling a beverage to a temperature suitable for consumption. It provides a space to store the beverage, an apparatus capable of heating or cooling the stored beverage, switching capable of changing the cup holder mode from heating to cooling and vice versa, and the power system necessary to support these functions.

4 Claims, 4 Drawing Sheets

HOT OR COLD CUP HOLDER FOR VEHICLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of vehicular cup holders, more specifically, a cup holder configured to supply either heat or coolness to a cup.

SUMMARY OF THE INVENTION

The Hot or Cold Cup Holder for Vehicles is a beverage holder that is capable of warming or cooling a beverage to a temperature suitable for consumption. It provides a space to store the beverage, an apparatus capable of heating or cooling the stored beverage, switching capable of changing the cup holder mode from heating to cooling and vice versa, and the power system necessary to support these functions.

These together with additional objects, features and advantages of the hot or cold cup holder for vehicles will be reading the following detailed description of the presently preferred, but nonetheless illustrative, embodiments when taken in conjunction with the accompanying drawings.

In this respect, before explaining the current embodiments of the hot or cold cup holder for vehicles in detail, it is to be understood that the hot or cold cup holder for vehicles is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hot or cold cup holder for vehicles.

It is therefore important that the claims be regarded as including such equivalent construction insofar as they do not depart from the spirit and scope of the hot or cold cup holder for vehicles. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
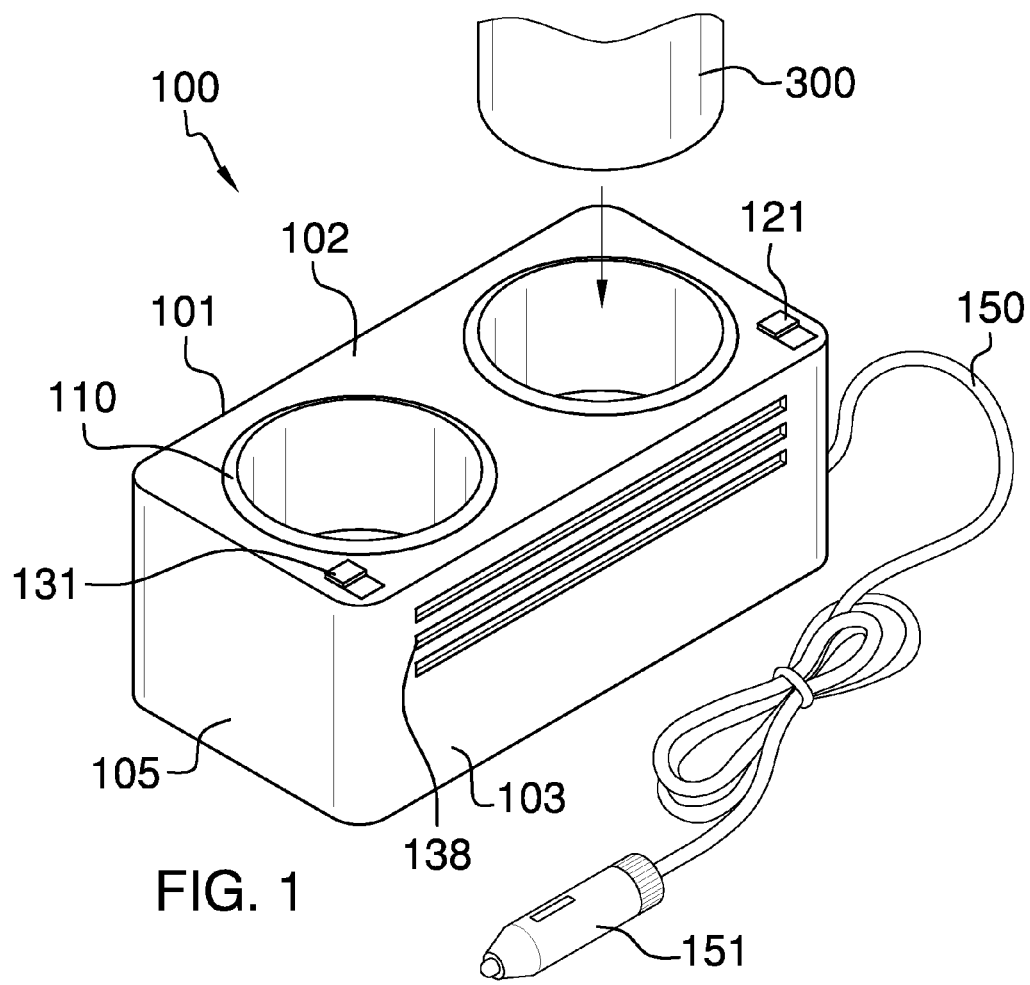
FIG. 1 is an isometric view of the Hot or Cold Cup Holder for Vehicles.
Figure 2:
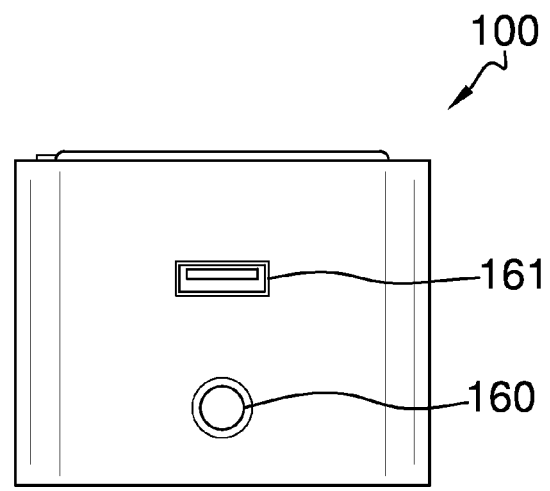
FIG. 2 is a side view of an embodiment of the disclosure.
Figure 3:
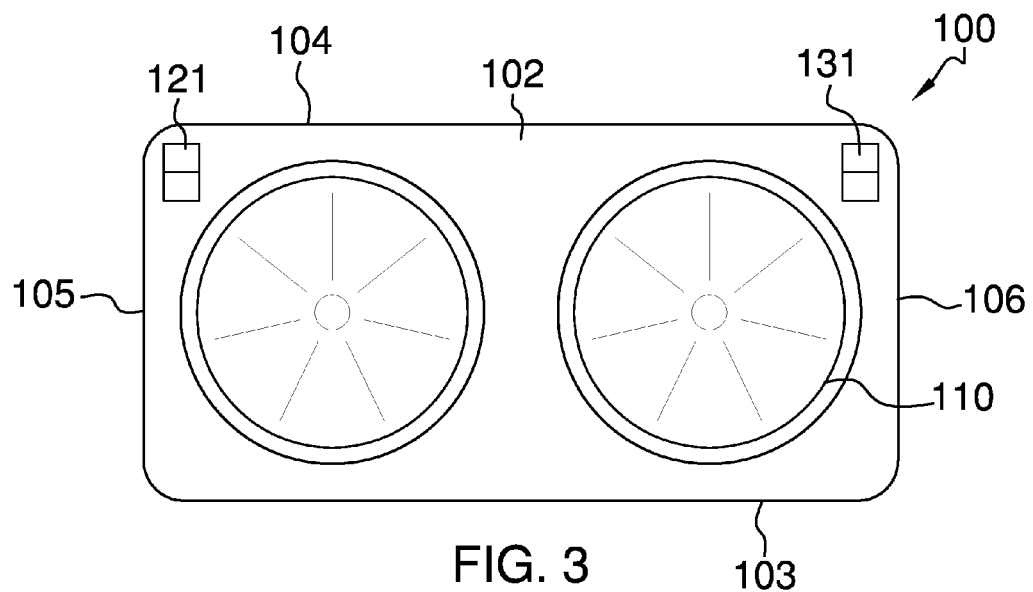
FIG. 3 is a top view of an embodiment of the disclosure.
Figure 4:
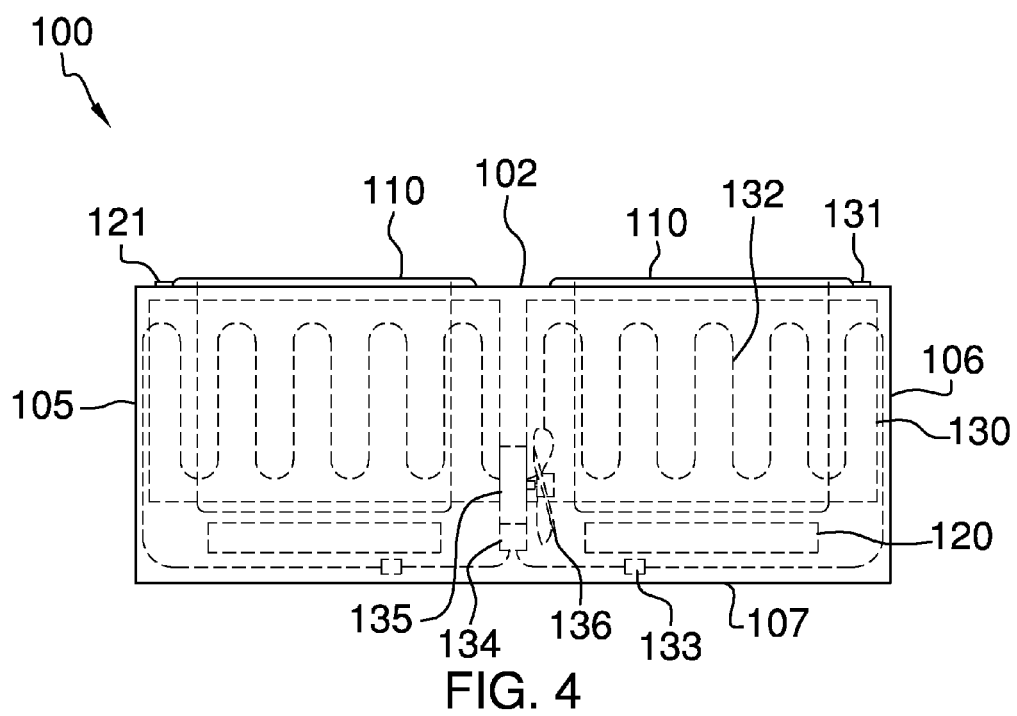
FIG. 4 is another side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the hot or cold cup holder for vehicles 100 (hereinafter invention) is further comprised of a housing 101 that is further defined with a top housing surface 102, a front housing surface 103, a rear housing surface 104, a left side housing surface 105, a right side housing surface 106, and a bottom surface 107. The housing 101 is configured to be placed on an interior surface 201 of a vehicle 200 in order to hold at least one cup 300 in place.

Figure 5:
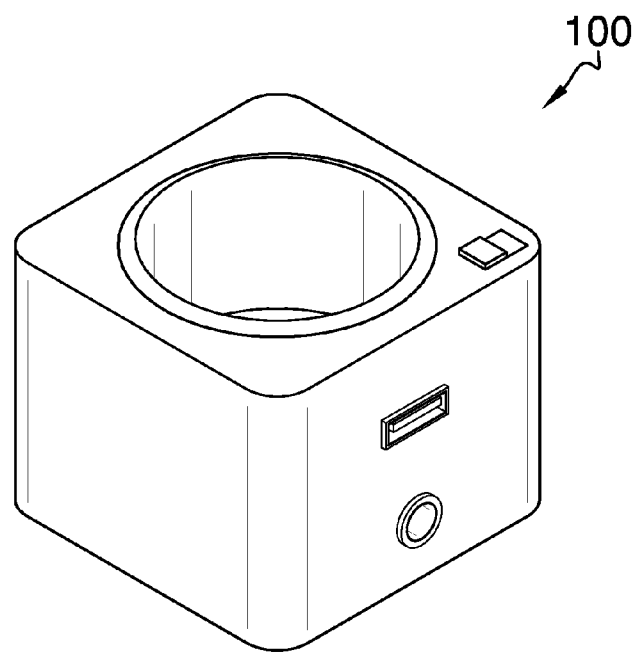
FIG. 5 is an isometric view of another embodiment of the disclosure.
Figure 7:
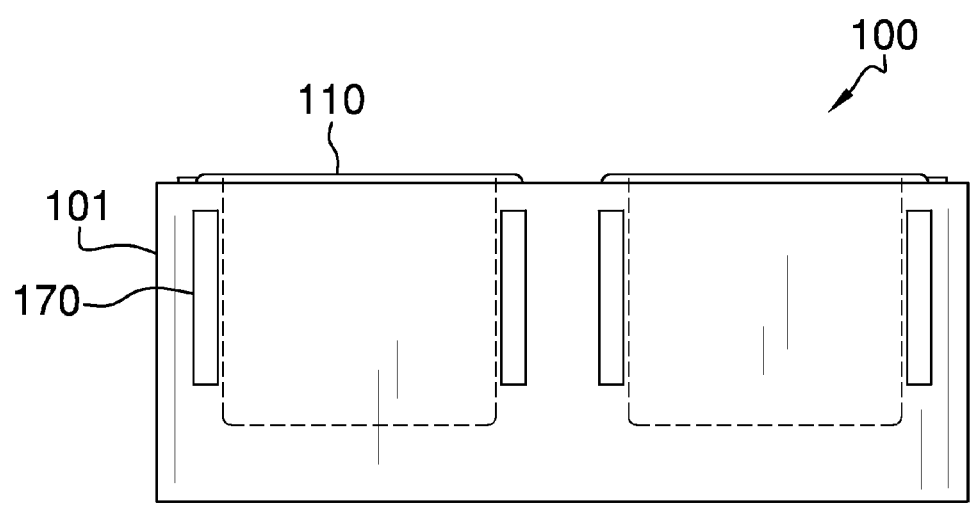
FIG. 7 is another view of an embodiment of the disclosure.
Figure 6:
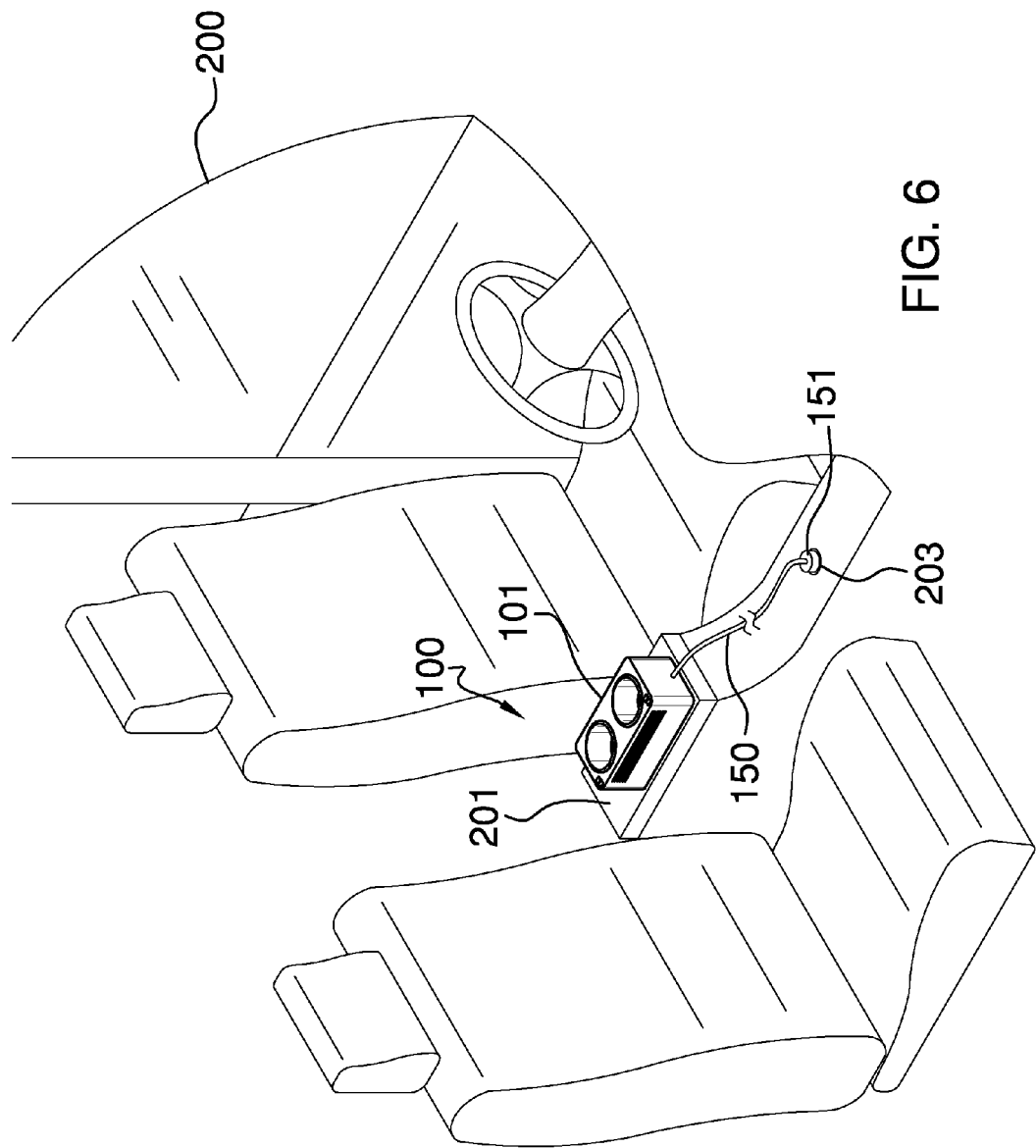
FIG. 6 is a view of an embodiment of the disclosure in use within a vehicle.

The housing 101 includes at least one cup holder 110 that is integrated into the top housing surface 102, and which extends downwardly. Referring to FIG. 5, the invention 100 may include a housing 100 with a single cup holder 110 as opposed to a plurality of cup holders 110. The housing 101 is also of hollowed construction, which accommodates a heating member 120 and a cooling member 130 therein. The heating member 120 and the cooling member 130 are able to heat or cool the cup holder 110.

The top housing surface 102 includes a heating control button 121 as well as a cooling control button 131. The heating control button 121 is in wired connection with the heating member 120 whereas the cooling control button 131 is in wired connection with the cooling member 130. The heating control button 121 turns on or off the heating member 120 whereas the cooling control button 131 turns on or off the cooling member 130.

The heating member 120 is located inside of the housing 101. Moreover, the heating member 120 is essentially a heating element that is positioned underneath the cooling member 130. The cooling member 130 is also located inside of the housing 101, and is positioned around the cup holders 110. The cooling member 130 includes a refrigeration cycle, and circulates refrigerant through a refrigeration coil 132.

Moreover, the cooling member 130 includes an expansion valve 133 that is upstream of a condenser 134 and compressor 135. The cooling member 130 includes a fan 136 adjacent the condenser 134 in order to extract heat from the refrigerant. The fan 136 expels said heat via venting 138 located on the front housing surface 103.

An alternate embodiment for the heating member 120 and the cooling member 130 would be the use of a thermoelectric cooling module available. The thermoelectric cooling module 170 would use the principle of the Peltier effect to serve both as the heating element or the cooling element depending on the direction of an electrical current flow through the thermoelectric cooling module 170. The thermoelectric cooling module 170 has two surfaces on opposite sides of the device. When current flows through the thermoelectric cooling module 170, heat is transferred from one surface to the surface on the opposite side of the thermoelectric cooling module 170. This creates a cold side and a warm side of the thermoelectric cooling module 170 that can be used as the cooling or heating members 130/120 of the invention 100. If the current flow through the thermoelectric cooling module 170 is reversed, the direction of heat transfer is reversed. The cold and warm sides of the thermoelectric cooling module 170 would also be reversed. The thermoelectric cooling module 170 can be mounted as part of the bottom or side walls of the cup holder 110 to provide these heating and cooling functions (see FIG. 7).

The invention 100 includes an electrical cord 150 that provides electricity to the invention 100. Moreover, the electrical cord 150 connects to both the heating control button 121 as well as the cooling control button 131. The heating control button 121 as well as the cooling control button 131 turns on or off electricity to the heating member 120 or the cooling member 130.

The electrical cord 150 is of an undefined length, and includes a cigarette lighter plug 151 on a distal end, which is configured to plug into a cigarette lighter 203. The electrical cord 150 plugs into a plug port 160 provided on the housing 101. The housing 101 also includes a USB port 161 to enable connection of the invention 100 to a USB plug where permitted. The electrical cord 150 derives electricity from the vehicle 200 in order to power the heating member 120 or the cooling member 130. The electrical cord 150 is a cable, with appropriately selected connectors, that connects the invention 100 to a power source independently provided, but typically shall be that of the vehicle 200. Depending on the design, the invention 100 can be powered off 240 Vac, 120 Vac, 12 Vdc, or 5 Vdc sources. These are standard utility grid, car battery or USB power sources.

Those skilled in the art will recognize that several optional features can be readily added to the above specification. These optional features include, but are not limited to: 1) provision of additional cup holders; 2) battery powered operation; 3) an on/off switch to control power to the overall invention; 4) the addition of switching to connect and disconnect power to the individual heating elements and cooling elements for an individual cup holder; 5) thermostatic controls to more precisely control beverage temperature; 6) the addition fans and vents to optimize the operation of the invention; and 7) decorative and other mechanical features that can be added to the base.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hot or cold cup holder for vehicles comprising:
a housing that includes at least one cup holder;
said housing is of hollowed construction, and includes a heating member and a cooling member therein so as to supply heat or cold to the cup holder;
said housing is configured to be placed on an interior surface of a vehicle;
said cup holder is configured to receive and support a cup therein;
said housing is further defined with a top housing surface, a front housing surface, a rear housing surface, a left side housing surface, a right side housing surface, and a bottom surface;
said housing includes at least one cup holder that is integrated into the top housing surface, and which extends downwardly;
wherein the heating member and the cooling member are able to heat or cool the cup holder;
said top housing surface includes a heating control button as well as a cooling control button;
wherein the heating control button is in wired connection with the heating member whereas the cooling control button is in wired connection with the cooling member; wherein the heating control button turns on or off the heating member whereas the cooling control button turns on or off the cooling member;
wherein the heating member is located inside of the housing; wherein the heating member is a heating element that is positioned underneath the cooling member; wherein the cooling member is also located inside of the housing, and is positioned around the cup holders; wherein the cooling member includes a refrigeration cycle, and circulates refrigerant through a refrigeration coil;
wherein the cooling member includes an expansion valve that is upstream of a condenser and compressor; wherein the cooling member includes a fan adjacent the condenser in order to extract heat from the refrigerant; wherein the fan expels said heat via venting located on the front housing surface.

2. The hot or cold cup holder for vehicles according to claim 1 wherein an electrical cord provides electricity to the heating member and the cooling member; wherein the electrical cord connects to both the heating control button as well as the cooling control button; wherein the heating control button as well as the cooling control button turns on or off electricity to the heating member or the cooling member.

3. The hot or cold cup holder for vehicles according to claim 2 wherein the electrical cord is of any length, and includes a cigarette lighter plug on a distal end, which is configured to plug into a cigarette lighter; wherein the electrical cord plugs into a plug port provided on the housing.

4. The hot or cold cup holder for vehicles according to claim 3 wherein the housing also includes a USB port to enable connection to a USB plug.

* * * * *